United States Patent
Foguenne et al.

(10) Patent No.: US 6,335,299 B1
(45) Date of Patent: Jan. 1, 2002

(54) GRAY GREEN SODA-LIME GLASS

(75) Inventors: Marc Foguenne, Saint-Denis (Namur); Camille Dupont, Heppignies, both of (BE)

(73) Assignee: Glaverbel S.A., Brussels (BE)

( * ) Notice: Subject to any disclaimer, the term of this patent is extended or adjusted under 35 U.S.C. 154(b) by 0 days.

(21) Appl. No.: 09/102,376

(22) Filed: Jun. 23, 1998

(30) Foreign Application Priority Data

Jun. 25, 1997 (LU) .................................. 90084

(51) Int. Cl.[7] .............................................. C03C 3/087
(52) U.S. Cl. ............................ 501/71; 501/70; 501/905
(58) Field of Search .............................. 501/64, 70, 71, 501/905

(56) References Cited

U.S. PATENT DOCUMENTS

| | | | |
|---|---|---|---|
| 5,411,922 A | 5/1995 | Jones | 501/71 |
| 5,545,596 A | 8/1996 | Casariego | 501/71 |
| 5,558,942 A * | 9/1996 | Itoh et al. | 501/71 |
| 5,582,455 A * | 12/1996 | Casagriego et al. | 501/71 |
| 5,688,727 A * | 11/1997 | Shelestak et al. | 501/71 |
| 5,700,579 A * | 12/1997 | Jeanvoine et al. | 501/71 |
| 5,728,471 A * | 3/1998 | Dupont et al. | 501/71 |
| 5,780,372 A * | 7/1998 | Higby | 501/71 |
| 5,837,629 A | 11/1998 | Combs et al. | 501/70 |
| 5,849,402 A * | 12/1998 | Kraemling et al. | 501/70 |
| 5,877,103 A * | 3/1999 | Dupont et al. | 501/64 |
| 5,905,047 A * | 5/1999 | Sasage et al. | 501/71 |
| 5,932,502 A * | 8/1999 | Longobardo et al. | 501/70 |
| 5,985,780 A * | 11/1999 | Casariego et al. | 501/71 |
| 6,010,775 A * | 1/2000 | Kraemling et al. | 501/70 |
| 6,071,840 A * | 6/2000 | Sasage et al. | 501/71 |

FOREIGN PATENT DOCUMENTS

| | | | |
|---|---|---|---|
| EP | 0536049 | * 4/1993 | |
| EP | 08034779 A1 | 10/1997 | C03C/4/02 |
| WO | 96/00194 | 1/1996 | C03C/3/087 |
| WO | 97/17303 | 5/1997 | C03C/3/087 |

* cited by examiner

*Primary Examiner*—Karl Group
(74) *Attorney, Agent, or Firm*—Piper Marbury; Rudnick & Wolfe LLP; Jerold I. Schneider

(57) ABSTRACT

A soda-lime glass which has a gray-green color, an excitation purity (P) of more than 7%, a light transmission of greater than 30% under Illuminant A and for a glass thickness of 4 mm, a selectivity (SE4) of greater than 1.55, and an ultraviolet radiation transmission (TUV4) of less than 10%, and which comprises soda-lime glass forming constituents as main constituents and coloring agents consisting essentially of, in weight %, more than 0.25 and less than 0.4% of FeO, from 0.9 to 1.8% of $Fe_2O_3$, from 0.001 to 0.010% of Co, from 0.0100 to 0.024% of $Cr_2O_3$, and from 0 to 0.2% of $V_2O_5$, in which the total quantity of iron is expressed as $Fe_2O_3$.

8 Claims, No Drawings

GRAY GREEN SODA-LIME GLASS

BACKGROUND OF THE INVENTION

1. Field of the Invention

The present invention relates to a soda-lime glass coloured dark green with a grey hue, composed of glass forming main constituents and colouring agents.

2. Description of the Related Art

The expression "soda-lime glass" is used here in the wide sense and relates to any glass which contains the following constituents (in percentages by weight):

| | |
|---|---|
| $Na_2O$ | 10 to 20% |
| CaO | 0 to 16% |
| $SiO_2$ | 60 to 75% |
| $K_2O$ | 0 to 10% |
| MgO | 0 to 10% |
| $Al_2O_3$ | 0 to 5% |
| BaO | 0 to 2% |
| BaO + CaO + MgO | 10 to 20% |
| $K_2O + Na_2O$ | 10 to 20%. |

This type of glass is very widely used in the field of glazing for buildings or motor vehicles, for example. It is commonly manufactured in the form of ribbon by the drawing or float process. Such a ribbon may be cut in the form of sheets which may then be bent or subjected to a treatment for enhancing the mechanical properties, for example a thermal toughening treatment.

When referring to the optical properties of a glass sheet, it is generally necessary to relate these properties to a standard illuminant. In the present description, 2 standard illuminants are used, Illuminant C and Illuminant A defined by the International Commission on Illumination (Commission Internationale de l'Eclairage or C.I.E.). Illuminant C represents average daylight having a colour temperature of 6700 K. Above all, this illuminant is useful for determining the optical properties of windows intended for buildings. Illuminant A represents the radiation of a Planck radiator having a temperature of approximately 2856 K. This illuminant represents the light emitted by car headlights and is essentially intended to determine the optical properties of windows intended for motor vehicles. The International Commission on Illumination has also published a document entitled "Colorimetry, Official Recommendations of the C.I.E." (May 1970) which describes a theory in which the calorimetric coordinates for the light of each wavelength of the visible spectrum are defined so as to be able to be represented on a diagram having orthogonal axes x and y, called a C.I.E. trichromatic diagram. This trichromatic diagram shows the locus representative of the light of each wavelength (expressed in nanometres) of the visible spectrum. This locus is called the "spectrum locus" and the light whose coordinates lie on this spectrum locus is said to have 100% excitation purity for the appropriate wavelength. The spectrum locus is closed by a line called the "purple boundary" which joins the points on the spectrum locus whose coordinates correspond to the 380 nm (violet) and 780 nm (red) wavelengths. The area lying between the spectrum locus and the purple boundary is that available for the trichromatic coordinates of any visible light. The coordinates of the light emitted by Illuminant C, for example, correspond to x=0.3101 and y=0.3162. This point C is regarded as representing white light and consequently has an excitation purity equal to zero for any wavelength. Lines may be drawn from point C to the spectrum locus at any desired wavelength and any point lying on these lines may be defined not only by its coordinates x and y but also as a function of the wavelength corresponding to the line on which it lies and of its distance from the point C with respect to the total length of the wavelength line. Consequently, the tint of the light transmitted by a sheet of coloured glass may be described by its dominant wavelength and its excitation purity expressed as a percentage.

In fact, the C.I.E. coordinates of light transmitted by a sheet of coloured glass will depend not only on the composition of the glass but also on its thickness. In the present description, as well as in the claims, all the values of the excitation purity P, of the dominant wavelength $\lambda_D$ of the transmitted light and of the light transmission factor (TLC5) of the glass are calculated from the spectral specific internal transmissions ($SIT_\lambda$) of a sheet of glass 5 mm in thickness. The spectral specific internal transmission of a glass sheet is governed solely by the absorption of the glass and may be expressed by the Beer-Lambert law:

$SIT_\lambda = e^{-E.A\lambda}$ where $A_\lambda$ is the absorption coefficient (in $cm^{-1}$) of the glass at the wavelength in question and E is the thickness (in cm) of the glass.

To a first approximation, $SIT_\lambda$ may also be represented by the formula:

$$(I_{3\lambda} + R_{2\lambda})/(I_{1\lambda} - R_{1\lambda})$$

where $I_{1\lambda}$ is the intensity of the visible light incident on a first face of the glass sheet, $R_{1\lambda}$ is the intensity of the visible light reflected by this face, $I_{3\lambda}$ is the intensity of the visible light transmitted by the second face of the glass sheet and $R_{2\lambda}$ is the intensity of the visible light reflected towards the interior of the sheet by this second face.

In the description which follows, as well as in the claims, the following are also used:

the total light transmission for Illuminant A (TLA) measured for a thickness of 4 mm (TLA4). This total transmission is the result of integrating, between the 380 and 780 nm wavelengths, the expression: $\Sigma T_\lambda . E_\lambda . S_\lambda / \Sigma E_\lambda . S_\lambda$, in which $T_\lambda$ is the transmission at the wavelength $\lambda$, $E_\lambda$ is the spectral distribution of the Illuminant A and $S_\lambda$ is the sensitivity of the normal human eye as a function of the wavelength $\lambda$;

the total energy transmission (TE), measured for a thickness of 4 mm (TE4). This total transmission is the result of integrating, between the 300 and 2150 nm wavelengths, the expression $\Sigma T_\lambda . E_\lambda / \Sigma E_\lambda$, in which $E_\lambda$ is the spectral energy distribution of the sun at 30° above the horizon;

the selectivity (SE), measured by the ratio of the total light transmission for Illuminant A to the total energy transmission (TLA/TE); and the total transmission in the ultraviolet, measured for a thickness of 4 mm (TUV4). This total transmission is the result of integrating, between 280 and 380 nm, the expression $\Sigma T_\lambda . U_\lambda / \Sigma U_\lambda$, in which $U_\lambda$ is the spectral distribution of the ultraviolet radiation which has passed through the atmosphere, defined in the DIN 67507 standard.

SUMMARY OF THE INVENTION

The present invention relates in particular to green glasses with a greyish hue. When the transmission curve of a transparent substance barely varies as a function of the visible wavelength, this substance is termed "neutral grey". In the C.I.E. system, it does not have a dominant wavelength and its excitation purity is zero. By extension, a body is regarded as grey if its spectral curve is relatively flat in the visible region but has, nevertheless, weak absorption bands making it possible to define a dominant wavelength and a low but non-zero purity. The green glass with a grey hue according to the present invention preferably has a dominant wavelength between 480 and 550 nm.

Green glasses are generally chosen for their protective properties with respect to solar radiation and their use in buildings is known. Green glasses are also used in architecture, as well as for partially glazing certain vehicles or railway carriage compartments. To prevent their contents from being seen from the outside, very dark glass is mainly used.

The present invention relates to a highly selective grey-hued dark green glass specially suitable for use in the form of vehicle windows and in particular as rear side windows and as rear windows.

Glasses with a high selectivity generally impose high absorption of infrared radiation, which makes them difficult to manufacture in conventional glass furnaces.

The invention provides a soda-lime glass coloured dark green, composed of main glass forming constituents and colouring agents, wherein it contains less than 0.4% by weight of FeO, in that it possesses an excitation purity of more than 5% and has, under Illuminant A and for a glass thickness of 4 mm, a light transmission (TLA4) of greater than 30%, a selectivity (SE4) of greater than 1.55 and an ultraviolet radiation transmission (TUV4) of less than 10%.

The combination of these optical properties is particularly advantageous in that it provides, while still ensuring a sufficient transmission of light through the glass, satisfying the recommended lower limits for reasons of safety at the rear of vehicles, a high selectivity and a low transmission value in the ultraviolet. This makes it possible both to avoid internal heating of volumes bounded by glazing according to the invention as well as unattractive fading of objects placed inside these volumes due to the effect of ultraviolet solar radiation.

DESCRIPTION OF THE PROFFERED EMBODIMENTS

Preferably, the glass according to the invention possesses a selectivity (SE4) of greater than 1.6.

It is remarkable that this result is obtained although the glass has a low upper limit of the FeO weight content. This value of the FeO content means that the glass can be produced by means of a conventional and possibly large-capacity furnace. The use of such a furnace is economical compared with that of small electric furnaces which normally have to be used in the manufacture of highly selective glasses. This is because, in such cases, the high FeO contents, in all circumstances greater than 0.4% by weight of the glass, make it difficult to melt it and require the use of small-capacity electric furnaces.

Iron is in fact present in most glasses existing on the market, either as an impurity or deliberately introduced as a colouring agent. The presence of $Fe^{3+}$ gives the glass a slight absorption of visible light at short wavelengths (410 and 440 nm) and a very strong absorption band in the ultraviolet (absorption band centred on 380 nm), while the presence of $Fe^{2+}$ ions causes a strong absorption in the infrared (absorption band centred on 1050 nm). The ferric ions give the glass a slight yellow colour, while the ferrous ions give a more pronounced blue-green colour. All other considerations being equal, it is the $Fe^{2+}$ ions which are responsible for the absorption in the infrared range and which therefore affect TE. The value of TE decreases, thereby increasing that of SE, when the $Fe^{2+}$ concentration increases. By favouring the presence of $Fe^{2+}$ ions over $Fe^{3+}$ ions, a high selectivity is therefore obtained.

Preferably, the glass according to the invention provides a TUV4 of less than 7%. Such a value naturally optimizes protection against the fading of objects lying in a volume bounded by a surface glazed by means of the glass according to the invention. This property is particularly advantageous in the automobile sector. This is because, the low transmission of ultraviolet radiation makes it possible to prevent, in vehicles, ageing and fading of the internal upholstery and fittings which are constantly exposed to the sun's action.

Advantageously, the dominant wavelength of the glass according to the invention is less than 550 nm, preferably less than 520 nm. Green glasses having a hue complying with these upper limits are regarded as attractive.

Preferably, the glass according to the invention comprises as colouring agent, in addition to iron, at least one of the elements selenium, chromium, cobalt, cerium and vanadium. The use of these elements makes it possible to adjust the optical properties of the glass in an optimum fashion and especially to obtain a highly selective glass.

It is possible to produce glass having an approximately similar colour to that of the glass according to the invention by using nickel as the main colouring agent. However, the presence of nickel has drawbacks, especially when the glass has to be produced by the float process. In the float process, a ribbon of hot glass is conveyed along the surface of a bath of molten tin so that its faces are flat and parallel. In order to avoid oxidation of the tin on the surface of the bath, which would lead to entrainment of tin oxide by the ribbon, a reducing atmosphere is maintained above the bath. When the glass contains nickel, the latter is partially reduced by the atmosphere above the bath of tin, giving rise to a haze in the glass produced. This element is also inconducive to obtaining a high value of the selectivity of the glass which contains it since it does not absorb light in the infrared range, which leads to a high TE value. In addition, nickel present in the glass can form the sulphide NiS. This sulphide exists in various crystalline forms, which are stable over different temperature ranges, and the transformations of which, from one form to another, create problems when the glass has to be reinforced by a thermal toughening treatment, as is the case in the automobile field and also for certain windows in buildings (balconies, spandrels, etc.). The glass according to the invention, which contains no nickel, is therefore particularly well-suited to manufacture by the float process as well as to being used in architecture or in the field of motor vehicles or other vehicles.

The effects of the various colouring agents envisaged individually for the production of a glass (according to "Le Verre" ["Glass"] by H. Scholze—translated by J. Le Dû—Glass Institute—Paris) are as follows:

Cobalt: the $Co^{II}O_4$ group produces an intense blue colour with a dominant wavelength almost opposite that given by the iron-selenium chromophor.

Chromium: the presence of the $Cr^{III}O_6$ group gives rise to absorption bands at 650 nm and gives a light green colour. A higher level of oxidation gives rise to the $Cr^{VI}O_4$ group which causes a very intense absorption band at 365 nm and gives a yellow colour.

Cerium: the presence of cerium ions in the composition makes it possible to obtain a strong absorption in the ultraviolet range. Cerium oxide exists in two forms: $Ce^{IV}$ absorbs in the ultraviolet around 240 nm and $Ce^{III}$ absorbs in the ultraviolet around 314 nm.

Selenium: the $Se^{4+}$ cation has practically no colouring effect, while the uncharged compound SeO gives a pink colour. The $Se^{2-}$ anion forms a chromophor with the ferric ions present and consequently gives the glass a brown-red colour.

Vanadium: for increasing contents of alkaline oxides, the colour changes from green to colourless, this being caused by oxidation of the $V^{III}O_6$ group to $V^VO_4$.

The energy and optical properties of a glass containing several colouring agents therefore result from a complex interaction between them. This is because these colouring agents have a behaviour which depends strongly on their redox state and therefore on the presence of other elements likely to influence this state.

A glass according to the invention may be obtained by using selenium among the colouring agents. Such a glass will contain the following percentages by weight of colouring agents:

$Fe_2O_3$ 1.5 to 1.8% (total iron)
FeO 0.25 to 0.30%
Co 0.0090 to 0.0145%
$Cr_2O_3$ 0.0015 to 0.0025%
Se 0.0003 to 0.0009%.

Associated with this composition are the following optical properties:

30%<TLA4<40%
20%<TE4<30%
TUV4<5%
490 nm $\lambda_D$ <500 nm
5%<P<15%.

However, in the preferred forms of the invention, the glass does not contain selenium which is expensive and is not efficiently incorporated into the glass.

Consequently, according to preferred forms of the invention, the glass comprises the following percentages by weight of colouring agents:

$Fe_2O_3$ 1.2 to 1.8% (total iron)
FeO 0.25 to 0.35%
Co 0.0020 to 0.0100%
$Cr_2O_3$ 0.0010 to 0.0100%
$CeO_2$ 0.1 to 0.8%.

The combination of these colouring agents and, in particular, the use of chromium and cerium is not unfavourable to the preservation of the refractory walls of the glass-manufacturing furnace, with respect to which walls they do not present any risk of corrosion.

An also preferred form of the invention corresponds to the presence in the glass of the following percentages by weight of colouring agents:

$Fe_2O_3$ 0.9 to 1.8% (total iron)
FeO 0.25 to 0.35%
Co 0.0010 to 0.0100%
$Cr_2O_3$ 0 to 0.0150%
$V_2O_5$ 0.01 to 0.2%.

The use of vanadium as a colouring agent offers the advantage of limiting the production costs of the glass according to the invention because of the inexpensive character of this element. Moreover, vanadium is also beneficial to environmental protection because of its barely polluting character.

The elements cerium and vanadium are both favourable to obtaining the low ultraviolet radiation transmission value of the glass according to the invention.

It is possible in particularly preferred forms of the invention to use only iron, cobalt and vanadium as colouring agents, in this case with the following percentages by weight:

$Fe_2O_3$ 0.9 to 1.8% (total iron)
FeO 0.25 to 0.35%
Co 0.0010 to 0.0100%
$V_2O_5$ 0.01 to 0.2%.

This glass, containing a limited number of colouring agents, is simpler to produce.

In other particularly preferred forms of the invention, vanadium and chromium are both present in non-zero proportions among the colouring agents. The latter will then, in their entirety, be used in the following percentages by weight:

$Fe_2O_3$ 0.9 à 1.8%
FeO 0.25 à 0.37%
Co 0.0010 à 0.0100%
$Cr_2O_3$ 0 à 0.0240%
$V_2O_5$ 0 à 0.2%

The simultaneous presence of chromium and vanadium ably preserves the walls of the furnace from the effects of corrosion.

The proportions of colouring agents defined above make it possible to obtain glasses whose optical properties lie within the ranges defined below:

30%<TLA4<55%
20%<TE4<30%
480 nm <$\lambda_D$<520 nm
5%<P<15%.

The light transmission range thus defined makes the glass according to the invention particularly useful for preventing users from being dazzled by the light of motor-vehicle headlights when it is used for side rear windows or as the rear window of vehicles. The corresponding energy transmission range provides the glass with its high selectivity. With regard to the ranges of dominant wavelengths and of excitation purity, these correspond to hues and a colour intensity which are particularly appreciated, especially according to the principles with regard to material which are currently in force in the architectural and automobile fields.

According to specially preferred forms of the invention, the glass comprises the following percentages by weight of colouring agents:

$Fe_2O_3$ 1.4 to 1.6%
FeO 0.29 to 0.31%
Co 0.0040 to 0.0070%
$Cr_2O_3$ 0.0030 to 0.0060%
$CeO_2$ 0.2 to 0.5%.

Another particularly preferred form of the invention corresponds to glasses comprising the following percentages by weight of colouring agents:

$Fe_2O_3$ 1.2 to 1.6%
FeO 0.29 to 0.31%
Co 0.0020 to 0.0050%
$V_2O_5$ 0.02 to 0.15%.

Associated with these compositions are the following ranges of optical properties:

40%<TLA4<50%
25%<TE4<30%
TUV4<6%
495 nm<$\lambda_D$<500 nm
7%<P<11%.

The glass corresponding to the more restricted colouring-agent concentration range defined above has a particularly high performance since it jointly optimizes the energy and light transmission properties in order to be used as the side rear windows and the rear window of a vehicle. When it is used for architectural purposes, it combines its aesthetic qualities with a significant energy-saving aspect connected with reducing the stress on air-conditioning systems.

Such a glass is preferably used in the form of sheets having a thickness of 3 or 4 mm for the side rear panes and the rear window of vehicles and thicknesses of more than 4 mm in buildings.

The glass according to the invention also preferably possesses a total light transmission under Illuminant C for a thickness of 5 mm (TLC5) of between 25 and 55%, which makes it conducive to elimination of dazzling by sunlight when it is used in buildings.

The glass according to the invention may be coated with a layer of metal oxides which reduces its heat-up by solar radiation and consequently that of the interior of a vehicle using such a glass as glazing.

The glasses according to the present invention may be manufactured by conventional processes. With regard to batch materials, it is possible to use natural materials, recycled glass, scoria or a combination of these materials. The colorants are not necessarily added in the form indicated, but this way of giving the quantities of colouring agents added, in equivalents in the forms indicated, corresponds to common practice. In practice, iron is added in the form of rouge, cobalt is added in the form of a hydrated sulphate, such as $CoSO_4.7H_2O$ or $CoSO_4.6H_2O$ and chromium is added in the form of a dichromate such as $K_2Cr_2O_7$. Cerium is introduced in the form of an oxide or carbonate. As regards vanadium, this is introduced in the form of vanadium oxide or sodium vanadate. Selenium, when it is present, is added in elemental form or in the form of selenite, such as $Na_2SeO_3$ or $ZnSeO_3$.

Other elements are sometimes present as impurities in the batch materials used for manufacturing the glass according to the invention (for example, manganese oxide in concentrations of about 100 ppm), whether in the natural materials, in the recycled glass or in the scoria, but when the presence of these impurities do not give the glass properties outside the limits defined above, these glasses are regarded as conforming to the present invention.

The present invention will be illustrated by the specific examples of the optical properties and compositions which follow.

EXAMPLES 1 to 54

Table I gives by way of indication the base composition of the glass as well as the constituents of the glass batch to be melted in order to produce the glasses according to the invention and Tables IIa and IIb give the optical properties and the proportions by weight of the colouring agents of a glass comprising, respectively, either chromium and cerium or vanadium and/or chromium among its colouring agents. Table III gives the optical properties and the proportions by weight of the colouring agents of a glass comprising selenium among its colouring agents. These proportions are determined by X-ray fluorescence of the glass and are converted into the molecular species indicated.

TABLE I

| Composition of the base glass | | Constituents of the base glass | |
|---|---|---|---|
| $SiO_2$ | 71.5 to 71.9% | Sand | 571.3 |
| $Al_2O_3$ | 0.8% | Feldspar | 29.6 |
| CaO | 8.8% | Lime | 35.7 |
| MgO | 4.2% | Dolomite | 167.7 |
| $Na_2O$ | 14.1% | $Na_2CO_3$ | 186.1 |
| $K_2O$ | 0.1% | Sulphate | 5.6 |
| $SO_3$ | 0.1 to 0.5% | | |

The glass batch may, if necessary, contain a reducing agent such as coke, graphite or slag, or an oxidizing agent such as a nitrate.

TABLE IIa

| Example | 1 | 2 | 3 | 4 | 5 | 6 | 7 | 8 | 9 |
|---|---|---|---|---|---|---|---|---|---|
| TLA4 (%) | 49,96 | 41,85 | 42,42 | 52,23 | 46,77 | 43,79 | 44,88 | 43,97 | 35,35 |
| TE4 (%) | 29,40 | 25,00 | 26,20 | 30,90 | 28,40 | 26,5 | 27,9 | 27,1 | 22,2 |
| $\lambda_D$* (nm) | 513,1 | 503,1 | 495,8 | 524,2 | 503,8 | 496,9 | 499,9 | 500,8 | 496,0 |
| P* (%) | 5,17 | 7,13 | 9,93 | 5,38 | 6,21 | 9,06 | 7,46 | 7,29 | 10,46 |
| TUV4 (%) | 3,5 | 2,3 | 3,2 | 3,3 | 3,3 | 3,4 | 2,9 | 2,7 | 1,5 |
| SE4 | 1,70 | 1,67 | 1,62 | 1,69 | 1,65 | 1,65 | 1,61 | 1,62 | 1,59 |
| $Fe_2O_3$ (%) | 1,39 | 1,55 | 1,48 | 1,36 | 1,47 | 1,47 | 1,46 | 1,46 | 1,71 |
| FeO (%) | 0,287 | 0,31 | 0,303 | 0,273 | 0,285 | 0,308 | 0,28 | 0,29 | 0,315 |
| Co (ppm) | 39 | 66 | 74 | 32 | 52 | 63 | 65 | 65 | 99 |
| $Cr_2O_3$ (ppm) | 50 | 51 | 61 | 49 | 39 | 38 | 45 | 52 | 55 |
| CeO (%) | 0,25 | 0,27 | 0,2 | 0,46 | 0,24 | 0,24 | 0,35 | 0,45 | 0,48 |

TABLE IIb

| Example | 10 | 11 | 12 | 13 | 14 | 15 | 16 | 17 |
|---|---|---|---|---|---|---|---|---|
| TLA4 (%) | 47,74 | 40,75 | 36,03 | 32,62 | 50,52 | 49,89 | 46,78 | 45,96 |
| TE4 (%) | 27,8 | 23,1 | 21,7 | 20,3 | 29,5 | 29,3 | 27,9 | 27,4 |
| $\lambda_D$* (nm) | 501,6 | 527,9 | 502,2 | 495,4 | 496,4 | 497,4 | 497,3 | 498,6 |
| P* (%) | 7,09 | 7,66 | 8,57 | 12,29 | 8,55 | 8,23 | 8,61 | 8,26 |
| TUV4 (%) | 3,9 | 1,6 | 1,6 | 1,6 | 6 | 5,5 | 4,3 | 3,8 |
| SE4 | 1,72 | 1,76 | 1,66 | 1,61 | 1,71 | 1,70 | 1,68 | 1,68 |
| $Fe_2O_3$(%) | 1,28 | 1,62 | 1,617 | 1,613 | 1,331 | 1,326 | 1,403 | 1,409 |
| FeO (%) | 0,311 | 0,35 | 0,34 | 0,35 | 0,304 | 0,302 | 0,302 | 0,305 |
| Co(ppm) | 41 | 48 | 82 | 105 | 44 | 43 | 54 | 55 |
| $V_2O_5$ (%) | 0,056 | 0,131 | 0,131 | 0,132 | 0,025 | 0,036 | 0,040 | 0,059 |

| Example | 18 | 19 | 20 | 21 | 22 | 23 | 24 |
|---|---|---|---|---|---|---|---|
| TLA4 (%) | 49,62 | 49,19 | 48,45 | 43,10 | 43,18 | 42,29 | 43,11 |
| TE4 (%) | 28,7 | 28,6 | 28,9 | 26,7 | 26,5 | 26,4 | 27,4 |
| $\lambda_D$* (nm) | 495,4 | 497,6 | 501,9 | 490,8 | 491,5 | 490,4 | 490,1 |
| P* (%) | 9,34 | 8,35 | 7 | 14,23 | 13,68 | 14,77 | 15,16 |

TABLE IIb-continued

| | | | | | | | |
|---|---|---|---|---|---|---|---|
| TUV4 (%) | 6 | 5,2 | 4,2 | 6,2 | 6,1 | 6,1 | 7,30 |
| SE4 | 1,73 | 1,72 | 1,68 | 1,61 | 1,63 | 1,60 | 1,57 |
| $Fe_2O_3$ (%) | 1,316 | 1,322 | 1,321 | 1,318 | 1,304 | 1,324 | 1,265 |
| FeO (%) | 0,313 | 0,308 | 0,294 | 0,302 | 0,306 | 0,300 | 0,29 |
| Co (ppm) | 45 | 43 | 44 | 82 | 76 | 90 | 82 |
| $V_2O_5$ (%) | 0,02 | 0,042 | 0,079 | 0 | 0 | 0 | 0 |
| $CrO_3$ (ppm) | 0 | 0 | 0 | 110 | 122 | 100 | 141 |

| Example | 25 | 26 | 27 | 28 | 29 | 30 | 31 |
|---|---|---|---|---|---|---|---|
| TLA4 (%) | 49,05 | 47,81 | 42,48 | 41,65 | 43,46 | 48,77 | 53,08 |
| TE4 (%) | 28,4 | 27,5 | 27,1 | 26,3 | 27,9 | 29,0 | 30,4 |
| $\lambda_D^*$ (nm) | 498,9 | 498,1 | 490,8 | 490,7 | 491,3 | 492,7 | 502,4 |
| P* (%) | 8,36 | 9 | 14,55 | 14,51 | 13,29 | 10,81 | 6,21 |
| TUV4 (%) | 6,1 | 6 | 6,4 | 5,3 | 5,6 | 6,3 | 5,5 |
| SE4 | 1,73 | 1,74 | 1,57 | 1,58 | 1,56 | 1,68 | 1,75 |
| $Fe_2O_3$ (%) | 1,280 | 1,263 | 1,267 | 1,312 | 1,291 | 1,358 | 1,402 |
| FeO (%) | 0,311 | 0,321 | 0,29 | 0,303 | 0,28 | 0,302 | 0,298 |
| Co (ppm) | 42 | 46 | 80 | 83 | 78 | 55 | 33 |
| $V_2O_5$ (%) | 0,033 | 0,031 | 0,022 | 0,032 | 0,031 | 0 | 0 |
| $Cr_2O_3$ (ppm) | 89 | 102 | 135 | 75 | 80 | 0 | 0 |

| Example | 32 | 33 | 34 | 35 | 36 | 37 | 38 |
|---|---|---|---|---|---|---|---|
| TLA4 (%) | 39,64 | 39,82 | 38,98 | 44,59 | 39,26 | 40,42 | 42,13 |
| TE4 (%) | 23,30 | 23,90 | 23,30 | 25,00 | 22 | 22,8 | 25,3 |
| $\lambda_D^*$ (nm) | 497,4 | 498,4 | 498,7 | 494,7 | 498,6 | 498,8 | 499,6 |
| P* (%) | 10,83 | 10,24 | 10,29 | 12,25 | 11,4 | 10,73 | 9,65 |
| TUV4 (%) | 3,70 | 3,50 | 3,30 | 4,60 | 4,3 | 4,6 | 4,7 |
| SE4 | 1,70 | 1,67 | 1,67 | 1,66 | 1,78 | 1,77 | 1,67 |
| $Fe_2O_3$ (%) | 1,446 | 1,435 | 1,442 | 1,321 | 1,405 | 1,383 | 1,346 |
| FeO (%) | 0,33 | 0,32 | 0,33 | 0,32 | 0,37 | 0,36 | 0,31 |
| Co (ppm) | 60 | 60 | 62 | 58 | 52 | 51 | 54 |
| $V_2O_5$ (%) | 0,030 | 0,040 | 0,049 | 0,038 | 0,037 | 0,041 | 0,034 |
| $Cr_2O_3$ (ppm) | 170 | 174 | 169 | 183 | 217 | 193 | 215 |

| Example | 39 | 40 | 41 | 42 | 43 | 44 | 45 |
|---|---|---|---|---|---|---|---|
| TLA4 (%) | 41,14 | 43,01 | 41,79 | 39,31 | 39,27 | 39,59 | 44,54 |
| TE4 (%) | 24,4 | 25,5 | 24,3 | 22 | 22,2 | 21,9 | 24,8 |
| $\lambda_D^*$ (nm) | 501 | 502,8 | 503 | 498,8 | 496,8 | 499,7 | 498,3 |
| P* (%) | 9,32 | 8,51 | 8,71 | 11,02 | 12,16 | 10,56 | 10,08 |
| TUV4 (%) | 4,1 | 4,5 | 4,1 | 4,4 | 5 | 4,4 | 4,6 |
| SE4 | 1,69 | 1,69 | 1,72 | 1,79 | 1,77 | 1,81 | 1,79 |
| $Fe_2O_3$ (%) | 1,399 | 1,358 | 1,389 | 1,366 | 1,349 | 1,392 | 1,319 |
| FeO (%) | 0,32 | 0,31 | 0,33 | 0,37 | 0,37 | 0,37 | 0,35 |
| Co (ppm) | 54 | 47 | 49 | 53 | 56 | 50 | 38 |
| $V_2O_5$ (%) | 0,040 | 0,037 | 0,042 | 0,038 | 0,041 | 0,052 | 0,023 |
| $Cr_2O_3$ (ppm) | 220 | 223 | 217 | 216 | 222 | 221 | 171 |

TABLE III

| Example | 46 | 47 | 48 | 49 | 50 | 51 | 52 | 53 | 54 |
|---|---|---|---|---|---|---|---|---|---|
| TLA4 (%) | 33,12 | 55,87 | 32,46 | 33,31 | 35,01 | 34,61 | 35,75 | 33,87 | 36,91 |
| TE4 (%) | 20,7 | 34,7 | 19,6 | 20,3 | 20,9 | 20,5 | 22,3 | 20,8 | 22,5 |
| $\lambda_D^*$ (nm) | 498,6 | 499,9 | 496,2 | 503,7 | 494,6 | 494,2 | 494,9 | 499,4 | 535,8 |
| P* (%) | 6,99 | 5,08 | 8,73 | 5,77 | 10,37 | 10,88 | 8,94 | 6,94 | 5,95 |
| TUV4 (%) | 3,2 | 9,1 | 2,9 | 2,6 | 2,9 | 2,9 | 3,5 | 2,8 | 2,8 |
| SE4 | 1,60 | 1,61 | 1,66 | 1,64 | 1,68 | 1,69 | 1,60 | 1,63 | 1,64 |
| $Fe_2O_3$ (%) | 1,48 | 1,09 | 1,52 | 1,54 | 1,55 | 1,55 | 1,52 | 1,61 | 1,47 |
| FeO (%) | 0,332 | 0,25 | 0,364 | 0,35 | 0,366 | 0,375 | 0,333 | 0,346 | 0,296 |
| Co (ppm) | 97 | 33 | 94 | 89 | 89 | 91 | 89 | 89 | 67 |
| $Cr_2O_3$ (ppm) | 22 | 14 | 22 | 17 | 17 | 19 | 17 | 15 | 30 |
| Se (ppm) | 10 | 3 | 7 | 7 | 3 | 4 | 6 | 7 | 7 |

NB*: expressed in SI for 5 mm under ill. C

What is claimed is:

1. A soda-lime glass which has a gray-green color, an excitation purity (P) of more than 7%, a light transmission of greater than 30% under Illuminant A and for a glass thickness of 4 mm, a selectivity (SE4) of greater than 1.55, and an ultraviolet radiation transmission (TUV4) of less than 10%, and which comprises soda-lime glass forming constituents as main constituents and coloring agents consisting essentially of, in weight %:

more than 0.25 and less than 0.4% of FeO, from 0.9 to 1.8% of $Fe_2O_3$, from 0.001 to 0.010% of Co, from 0.0100 to 0.024% of $Cr_2O_3$, and from 0 to 0.2% of $V_2O_5$, in which the total quantity of iron is expressed as $Fe_2O_3$.

2. The soda-lime glass according to claim 1, wherein the soda-lime glass has optical properties as follows:

30%<TLA4<55%,

20%<TE4<30%,

480nm<$\lambda_D$<520 nm, and

P<15%, where TE4 is total energy transmission for a glass thickness of 4 mm, and where $\lambda_D$ is dominant wavelength.

3. The soda-lime glass according to claim 1, wherein the soda-lime glass has a selectivity (SE4) of greater than 1.6.

4. The soda-lime glass according to claim 1, wherein the soda-lime glass has a TUV4 of less than 7%.

5. The soda-lime glass according to claim 1, wherein the soda-lime glass has for a glass thickness of 5 mm, a dominant wavelength ($\lambda_D$) of less than 550 nm.

6. The soda-lime glass according to claim 5, wherein the soda-lime glass has for a glass thickness of 5 mm, a dominant wavelength ($\lambda_D$) of less than 520 nm.

7. The soda-lime glass according to claim 1, wherein the soda-lime glass has for a thickness of 5 mm, a light transmission under Illuminant C (TLC5) which ranges between 25 and 55%.

8. A soda-lime glass which has a gray-green color, an excitation purity (P) of more than 7%, a light transmission of greater than 30% under Illuminant A and for a glass thickness of 4 mm, a selectivity (SE4) of greater than 1.55, and an ultraviolet radiation transmission (TUV4) of less than 10%, and which comprises soda-lime glass forming constituents as main constituents and coloring agents consisting essentially of, in weight %:

more than 0.25 and less than 0.4% of FeO, from 0.9 to 1.52% of $Fe_2O_3$, from 0.0033 to 0.01% of Co, and from 0.0100 to 0.024% of $Cr_2O_3$, in which total quantity of iron is expressed as $Fe_2O_3$.

* * * * *

UNITED STATES PATENT AND TRADEMARK OFFICE
CERTIFICATE OF CORRECTION

PATENT NO. : 6,335,299 B1
DATED : January 1, 2002
INVENTOR(S) : Marc Foguenne et al.

It is certified that error appears in the above-identified patent and that said Letters Patent is hereby corrected as shown below:

Column 5,
Line 61, "$V_2O_5$ 0.01 to 0.2%" should read -- $V_2O_5$ 0 to 0.2% --.

Column 6,
Line 20, "$Fe_2O_3$ 0.9 à 1.8%" should read -- $Fe_2O_3$ 0.9 to 1.8% --.
Line 21, "FeO 0.25 à 0.37%" should read -- FeO 0.25 to 0.37% --.
Line 22, "Co 0.0010 à 0.0100%" should read -- Co 0.0010 to 0.0100% --.
Line 23, "$Cr_2O_3$ 0 à 0.0240%" should read -- $Cr_2O_3$ 0 to 0.0240% --.
Line 24, "$V_2O_5$ O à 0.2%" should read -- $V_2O_5$ O to 0.2% --.
Line 52, "$Fe_2O_3$ 1.4to 1.6%" should read -- $Fe_2O_3$ 1.4 to -- 1.6% --.

Column 9,
Line 8, Table IIb-continued, first column "$CrO_3$ (ppm)" should read -- $Cr_2O_3$ (ppm) --.
Line 22, Table IIb-continued, fifth column "44,59" should read -- 41, 59 --.

Signed and Sealed this

Twenty-sixth Day of November, 2002

Attest:

Attesting Officer

JAMES E. ROGAN
Director of the United States Patent and Trademark Office